United States Patent
Watari et al.

(10) Patent No.: US 7,459,178 B2
(45) Date of Patent: Dec. 2, 2008

(54) PRODUCTION OF ORIENTED MATERIAL OR COMPOSITE MATERIAL THROUGH CENTRIFUGAL BURNING

(75) Inventors: Koji Watari, Aichi (JP); Kazuo Nakamura, Aichi (JP); Kimiyasu Sato, Aichi (JP); Yoshiaki Kinemuchi, Aichi (JP); Shoji Uchimura, Aichi (JP); Hirohide Ishiguro, Aichi (JP); Hideki Morimitsu, Aichi (JP)

(73) Assignees: National Institute of Advanced Industrial Science and Technology, Tokyo (JP); Sinto V-Cerax, Ltd., Toyokawa-shi (JP)

( * ) Notice: Subject to any disclaimer, the term of this patent is extended or adjusted under 35 U.S.C. 154(b) by 610 days.

(21) Appl. No.: 10/494,037

(22) PCT Filed: Nov. 5, 2002

(86) PCT No.: PCT/JP02/11510
§ 371 (c)(1),
(2), (4) Date: May 7, 2004

(87) PCT Pub. No.: WO03/040061
PCT Pub. Date: May 15, 2003

(65) Prior Publication Data
US 2005/0006022 A1    Jan. 13, 2005

(30) Foreign Application Priority Data
Nov. 9, 2001  (JP) ................ 2001-344947
Jul. 15, 2002  (JP) ................ 2002-206059

(51) Int. Cl.
*B05D 1/40* (2006.01)
*B05D 3/02* (2006.01)
*B05D 3/08* (2006.01)
*B28B 1/20* (2006.01)
*C04B 35/64* (2006.01)

(52) U.S. Cl. .............. 427/180; 427/240; 264/636; 264/632

(58) Field of Classification Search ............... 427/180, 427/240
See application file for complete search history.

(56) References Cited

U.S. PATENT DOCUMENTS

| | | | | |
|---|---|---|---|---|
| 4,937,214 A | * | 6/1990 | Morita et al. | .......... 501/127 |
| 5,527,501 A | * | 6/1996 | Sawada et al. | .......... 264/608 |
| 6,663,828 B2 | | 12/2003 | Watari et al. | |

FOREIGN PATENT DOCUMENTS

| | | | |
|---|---|---|---|
| JP | 6-107491 | | 4/1994 |
| JP | 06107491 A | * | 4/1994 |
| JP | 7-196380 | | 8/1995 |
| JP | 7-242424 | | 9/1995 |

(Continued)

*Primary Examiner*—William P. Fletcher, III
*Assistant Examiner*—Cachet I Sellman
(74) *Attorney, Agent, or Firm*—Oblon, Spivak, McClelland, Maier & Neustadt, P.C.

(57) ABSTRACT

A process for producing a ceramic sinter or inorganic film in which anisotropic particles or anisotropic crystals have been oriented; or a process for producing a bonded composite material which comprises a base sample and another material tenaciously bonded to a surface of the base. The processes are characterized by imposing a centrifugal force during burning (heating).

5 Claims, 8 Drawing Sheets

FOREIGN PATENT DOCUMENTS

| JP | 07242424 A | * | 9/1995 |
| JP | 10114570 A | * | 5/1998 |
| JP | 2000-268784 | | 9/2000 |
| JP | 2000268784 A | * | 9/2000 |
| JP | 2002-193680 | | 7/2002 |
| JP | 2002193680 A | * | 7/2002 |

* cited by examiner

PRODUCTION OF ORIENTED MATERIAL OR COMPOSITE MATERIAL THROUGH CENTRIFUGAL BURNING

TECHNICAL FIELD

The present invention relates to a method for manufacturing a material endowed with prescribed functionality and physical properties by imposing a centrifugal force on the material during the heating step. More particularly, the first aspect of the present invention relates to a ceramic sinter or inorganic film in which anisotropic particles or anisotropic crystals are oriented in one direction, and to a manufacturing method thereof.

The second aspect of the present invention relates to a method for manufacturing an adhesive material in which the material is tenaciously bonded to the surface of a base sample; an adhesive material produced thereby; a method for manufacturing an adhesive material in which organic substance, metal, ceramic, or other material, for example, is tenaciously bonded to plastic, metal, single crystal, ceramic, glass, or another surface of a base sample, for example; and an adhesive material produced thereby.

The present invention is useful as a method for providing a novel technology for fabricating a ceramic sinter or inorganic film in which particles and crystals are oriented; and a novel technology for fabricating a composite adhesive material endowed with prescribed functionality and physical properties, in which a material is tenaciously bonded to the surface of a base sample with a simple operating process by imposing a prescribed pressure on the material by way of a pressure means in accordance with a noncontact method without directly imposing mechanical pressure on the material.

BACKGROUND ART

First, the first aspect of the present invention is described.

Normally, manufacturing methods for a ceramic sinter in which particles or crystals are oriented are largely divided into the following two methods.

(1) A method whereby ceramic particles with anisotropic shapes are oriented within a molded article, and thereafter sintered.

With this method, a doctor blade process, an extrusion molding process, or another process is used to orient ceramic particles with anisotropic shapes within a molded article. Recently, attempts have been made to use the crystalline magnetic anisotropy within a substance to orient crystals within a molded article by imposing a magnetic field during molding. Thus, a ceramic sinter in which the particles or crystals are oriented can be manufactured by sintering, in the atmosphere or a specific environment, a molded article in which the particles and crystals are oriented in advance.

(2) A method whereby a ceramic molded article with anisotropic crystals is heated or sintered while pressure is applied from one or two directions.

Representative examples of this method include hot-press sintering, forge-sintering, and sinter-forging. All of these methods are methods for heating or sintering while imposing a mechanical pressure load from one or two directions on a molded article or a sinter that contains large anisotropic crystals or ceramic particles with anisotropic shapes, and oriented materials can be easily manufactured thereby.

In both cases of hot-press sintering and forge-sintering, a die containing a raw material powder is placed in a furnace and heated while mechanical pressure is applied, or pressure is applied after a predetermined temperature is reached.

In common practice, sinter-forging is a method in which a molded article that contains large anisotropic crystals or ceramic particles with anisotropic shapes is sintered, and mechanical pressure is then applied from one direction to obtain an oriented material. It is known that when the mechanical load pressure is high the degree of particle or crystal orientation is also high.

Next, conventional manufacturing methods for inorganic films can be largely divided into liquid-phase methods and gas-phase methods because the starting raw material is commonly different.

The sol-gel process is a representative technique of liquid-phase methods. This method is a method for obtaining an inorganic film by admixing an alkoxide or the like so as to achieve a prescribed composition, applying the resulting mixed solution to a single crystal substrate composed of Si, $SrTiO_3$, or the like, and heat-processing this in an electric furnace. With such sol-gel processes, an inorganic film in which the particles or crystals are oriented and which possesses a lattice constant that is approximate to or equal to the lattice constant of the desired ceramic film can be obtained by way of nucleation and epitaxial growth on the substrate through the use of a single crystal substrate that possesses strong crystal orientation in one direction. Technology for manufacturing film with pronounced crystal orientation by using single crystal particles as seed particles, aligning the crystal directions in advance, and mounting the crystals on a substrate has recently been reported.

The following drawbacks result from the normal manufacturing methods described above in the manufacture of an inorganic film and a ceramic sinter in which pronounced particles or crystals are oriented. The term "pronounced particles or crystals are oriented" refers to the case in which the ratio of oriented particles or crystals is considerable with respect to the desired particles or crystals.

(1) The doctor blade process is a technique that is normally carried out by forming a slurry comprising solvents, plasticizers, binders, or other additives, allowing the slurry to flow from a knife edge called a doctor, receiving the slurry onto a carrier film, and moving the film while drying to fabricate a ceramic sheet with a thickness of several tens to 100 μm. A ceramic molded article is fabricated by laminating 10 to 100 sheets of the resulting ceramic sheet and removing the binder contained in the resulting laminated article. With this method, because the particles with anisotropic shapes become oriented when they flow from the knife edge, it is important to reduce the thickness of the ceramic sheet in order to achieve pronounced orientation within the molded article. As a result, the method has a drawback in that the number of laminated sheets must be greatly increased in order to obtain a thick laminated molded article. The manufacturing processing steps of this method are lengthy, fabrication requires a considerable amount of time, and highly trained personnel is needed to manufacture a sheet without defects, in addition to other drawbacks.

(2) The extrusion molding process extrudes a plasticized ceramic base comprising powders, solvents, plasticizers, binders, and other additives into a die having a prescribed shape with the aid of a screw or another means to fabricate a molded article. At this time, particles with needle shapes, rod shapes, disc shapes, plate shapes, or other anisotropic shapes are oriented in parallel to the extrusion direction. However, this has drawbacks in that large differences in the degree of particle orientation occur on the surface of the extruded molded article and in its interior, and distortion in the shape of the sinter, cracking-induced breakage, swelling, and other defects easily occur during heating or sintering.

(3) The crystal orientation technique that makes use of the magnetic anisotropy of the crystals in a material is determined by the applied magnetic force due to the orientation and degree of magnetic anisotropy of the crystal axis. As a result orienting a crystal may be difficult for some materials when the magnetic anisotropy of the crystal axis is small or when the magnetic flux for generating a magnetic field is small. A magnetic field generator is expensive, and is not suitable as production equipment for common use because expenses are incurred for maintenance and safety management.

(4) Hot-press sintering, forge-sintering, sinter-forging, and other methods are processing technologies that are capable of orienting particles and crystals within a ceramic sinter during baking, but all these methods have drawbacks in that they require that pressure be applied to a sample with the aid of a push rod or a mold die, so the contact material surface becomes soiled and byproducts based on the soiling are easily generated. As a result, the surface of the sample must be polished or ground after baking, and manufacturing costs are increased. Also, considering the polishing or grinding after baking, these methods have drawbacks in that they cannot be applied to manufacturing oriented films comprising a thin film with a thickness of only several tens of micrometers to several millimeters.

The first aspect of the present invention was contrived to solve the drawbacks described above, and provides a method for manufacturing a ceramic sinter and an inorganic film that does not require a special skill, a magnetic generator or other special device, or processing after grinding, and by which the surface and the center portion of particles or crystals are oriented with a uniform orientation by means of a simple operation, and further provides a ceramic sinter and an inorganic film.

Next, the second aspect of the present invention is described.

Bonding different types of materials or bonding materials of the same type is an important technology from the standpoint of endowing base samples with new functions, bringing together or compounding material functions, and improving thermal resistance and thermal shock characteristics. Normally, bonding different types of materials or bonding materials of the same type involves the adoption of either (1) a method for inserting an intermediate material between materials, or (2) a method for applying mechanical pressure to a material to be bonded. Of these methods, method (1) uses as a bonding material a material that normally forms a liquid phase at a low melting point or softens at a low temperature. Furthermore, stress-alleviating material is sandwiched and bonded between the materials to be bonded in order to alleviate stress that is generated by the difference in thermal expansion of the materials.

However, when this type of bonding material and stress-alleviating material is used, problems occur in that the bonding step becomes complicated, the bonding material or the stress-alleviating material portion becomes a source of breakage, and so on. A lead-based material is used in large quantities as the low-melting bonding material, but from the standpoint of water pollution, environmental pollution, and sanitary considerations, the use of lead-based materials has been restricted in recent years. Next, bonding is carried out through the use of a hot-press sintering device, a crimping device, or another device when materials that having a thickness of several centimeters or more are bonded with the methods described in (2) above. In this case, there are advantages in that bonding materials and stress-alleviating materials can be dispensed with, but the drawbacks include the fact that the size of the sample that can be bonded is limited by the size of the hot press push rod, a processing and removal step is required because the contact surface with the push rod becomes soiled, the thickness of the material to be bonded is limited, and bonding a material to the surface of a sample with a complex shape is difficult.

The second aspect of the present invention was contrived to solve the drawbacks described above, and provides a method for tenaciously bonding a material to the surface of the base sample, and provides a product thereof.

DISCLOSURE OF THE INVENTION

As a result of thoroughgoing research to solve the problems stated above, the present inventors perfected the present invention having discovered that a ceramic sinter and an inorganic film in which the particles or crystals are oriented can be obtained by imposing a centrifugal force during heating.

In other words, the present invention provides a method for manufacturing a ceramic sinter in which the particles or crystals are oriented, characterized in that the ceramic particles are oriented by imposing a centrifugal force during the heating step on a ceramic molded article containing ceramic particles with anisotropic shapes, or on a ceramic molded article containing ceramic particles with anisotropic crystals.

The present invention also provides a method for manufacturing an inorganic film, characterized in that a precursor film is formed on a single crystal substrate or on a substrate on which a metal or ceramic has been vapor-deposited, and anisotropic particles or anisotropic crystals are oriented by imposing a centrifugal force during the heating step.

Suitably adopted in the present invention are an aspect for imposing a centrifugal force of 10 to 700,000 G during the heating step, and an aspect for performing heating at a temperature of 100 to 1,900° C. during the heating step.

Furthermore, the present invention provides a ceramic sinter characterized by being manufactured by means of the above-described method for manufacturing a ceramic sinter, with the particles or crystals oriented in a prescribed direction, and provides an inorganic film characterized by being manufactured by means of the above-described method for manufacturing an inorganic film, with the particles or crystals oriented in a prescribed direction.

The inventors, in view of the prior art described above, perfected the present invention through thoroughgoing research with the goal of developing a novel material bonding technology that is capable of wholly solving the drawbacks of prior art, and discovered a method for bonding material to the surface of a base sample, wherein it is possible to easily manufacture a composite adhesive material in which the material is tenaciously bonded to the target base sample by imposing a prescribed centrifugal force when the material is heated.

In other words, the present invention provides a bonding method for tenaciously bonding a material to the surface of a base sample.

The present invention provides a method for manufacturing a composite adhesive material in which a material has been tenaciously bonded to the surface of the base sample with the above-described method.

The present invention further provides an adhesive material endowed with prescribed functionality and physical properties and manufactured by imposing a prescribed pressure on the material by way of a pressure means in a noncontact manner without directly imposing mechanical pressure on the material in accordance with the method described above.

The first aspect of the present invention is described below with reference to FIG. 1.

The method of manufacturing a ceramic sinter of the present invention is one in which one or more types of anisotropic oxide, nitride, carbide, and boride particles or crystals, for example, are used, and a ceramic molded article comprising ceramic particles with anisotropic shapes, or a ceramic molded article comprising ceramic particles with anisotropic crystals is sintered under a centrifugal force that is preferably 10 to 700,000 G during the heating step in which the temperature is preferably 100 to 1,900° C. to orient the ceramic particles.

In this case, $Al_2O_3$, mullite ($3Al_2O_3 \cdot 2SiO_2$), or $Sr_3Ti_2O_7$ as an oxide, $\beta$-$Si_3N_4$ or h-BN as a nitride, and $\alpha$-SiC as a carbide are examples of ceramic particles having anisotropic shapes or anisotropic crystals.

The method of manufacturing an inorganic film of the present invention is one in which a precursor film is formed on a single crystal substrate or on a substrate on which a metal or ceramic has been vapor-deposited, and one or more types of anisotropic oxide, nitride, carbide, and boride particles or crystals, for example, in the film are oriented by imposing a centrifugal force that is preferably 10 to 700,000 G during the heating step in which the temperature is preferably 100 to 1,900° C.

In the present invention, anisotropy is a term that is contrasted with the term "isotropy," and particularly refers to formations with characteristic shapes whose length, surface area, and thickness are different in specific directions, and, more specifically, is a term that refers to needle shapes, rod shapes, disc shapes, plate shapes, or other anisotropic shapes.

Of the manufacturing devices to which the present invention can be applied, the sintering device described in Japanese Patent Application Laid-open No. 2002-193680 is preferred. This sintering device is a centrifugal sintering device for obtaining a sinter or film by heating and baking a molded article, precursor film, or other workpiece comprising a ceramic or metal powder while imposing a centrifugal force.

This device has a work holder capable of high speed rotation and designed for mounting the workpiece, a heating unit for heating the work holder, a temperature control unit for the heating unit, a rotation unit for rotating the work holder, a rotation speed control unit, a magnetic bearing unit with a vacuum seal, and a lid for hermetic sealing.

This centrifugal sintering device generates a centrifugal force by rotating the work holder at high speed inside the heating device, and a ceramic sinter or an inorganic film with oriented particles or crystals can be manufactured by imposing a centrifugal force on the sample (workpiece) mounted inside the work holder while heating and baking.

Describing the case of a ceramic sinter as an object of the present invention, a molded article having ceramic particles with anisotropic shapes or a molded article having ceramic particles with anisotropic crystals is first prepared in advance. The molded article may be an article that is shaped in a mold die and CIP-molded, or a laminated sheet obtained by tape casting and screen printing, or an article obtained by other means. The article is placed inside a work holder that rotates at a high speed within a centrifugal sintering device such as that described above; and the ceramic particles present therein are oriented by being rotated at a high speed while heated to obtain a sinter with oriented particles or crystals.

This orientation principle is based on the fact that particles become oriented in order to take a stable position under a large centrifugal force that works in the radial direction of the work holder in relation to the ceramic particles with anisotropic shapes present within the workpiece. As shown in FIG. 1, for example, plate-shaped particles 12a that are present within an object prior to the application of a centrifugal force are arranged in an irregular fashion in the workpiece 12 that is placed in the work holder 11, as shown in FIG. 1(A), but when a centrifugal force is imposed on the workpiece, the surfaces of the plate-shaped particles 12a align in the direction perpendicular to the centrifugal force in order to take mutually stable positions, and the particles become oriented within the sinter and molded article, or the workpiece 12, as shown in FIG. 1(B). In this case, the oriented shape is not limited to particles with needle shapes, rod shapes, plate shapes, and disc shapes, but whisker shapes and other shapes are also included.

The precursor film used in the manufacture of an oriented film as an-object of the present invention is not particularly limited in terms of the fabrication method, but it is important to form a precursor film without cracks on a single crystal substrate or on a substrate on which metal or ceramic has been vapor-deposited. The sol-gel process, in which a solution is the starting material, is widely used in the fabrication of precursor films and may be used as the fabrication method for a precursor film. In this case, a precursor film may be fabricated with the following two methods. The first method is the tape coating method in which a prescribed substrate is immersed in a sol solution, and the second method is the spin coating method in which a sol solution is applied to a substrate mounted on a rotating disc.

When a centrifugal force is imposed on a precursor obtained in such a manner under a heating temperature, this precursor places considerable stress on the substrate, the reaction between the precursor and the substrate is accelerated at this time due to the generated stress, and nucleation and epitaxial growth on the substrate are accelerated in association therewith. As a result, an inorganic film comprising an oriented film with pronounced particle or crystal orientation can be manufactured.

As described above, the basic principle of the present invention entails placing a molded article or substrate that is to be sintered in the work holder that rotates at a high speed, imposing a centrifugal force on the surface of the base sample, and thereby obtaining an oriented sinter or film. The force produced by the centrifugal force described above is preferably 10 to 700,000 G, and even more preferably 1,000 to 10,000 G.

When the radius of the discoid work holder that rotates at a high speed is 8 cm, and the workpiece is placed in the peripheral area within the work holder, the relationship between the rotational speed and the centrifugal force is as follows.

Rotational speed of 500 rpm: 22 G; 1,000 rpm: 89 G; 1,500 rpm: 201 G; 2,000 rpm: 357 G; 3,000 rpm: 804 G; 5,000 rpm: 2,236 G; 10,000 rpm: 8,944 G; 20,000 rpm: 35,776 G; and 50,000 rpm: 223,600 G.

These forces are large in comparison with the force applied during normal hot-press sintering, and, as a result, the movement and rotation of the anisotropic-shaped particles in the ceramic molded article are facilitated, or the reaction between the substrate and the precursor film is accelerated, allowing the particles and crystals within the ceramic or inorganic film to become oriented.

The method of the present invention differs from hot-press sintering and other methods in that because pressure is applied in a noncontact manner, byproducts are not generated and the surface of the sample is not soiled after baking, so the surface of the sample does not require grinding or polishing. As a result, this technology can be said to be suitable for a workpiece in the form of a thin film, and it is possible to orient the particles and crystals in a very efficient manner.

In the present invention, the heating temperature that allows the particles and crystals to become oriented is not particularly limited. The reason for this is that the diffusion rate of the substance varies greatly depending on the type of material of the desired workpiece. However, to orient the particles or crystals, the preferred heating temperature is normally 100 to 1,500° C. in the case of an inorganic film, and 500 to 1,900° C. in the case of a ceramic sinter. The reason for this is that the inorganic film is composed of fine particles, and so the diffusion rate of the substance is apparently quickened and orientation is possible at lower temperatures. In the case of a ceramic sinter, the particles coalesce (the particles become larger) within the sinter in the latter stages of sintering, so a high temperature is required to accelerate the particle and crystal orientation.

The detailed description given above in conjunction with the description of the method of the present invention concerned a ceramic sinter manufactured by means of a method for manufacturing a ceramic sinter in which the particles or crystals are oriented in a prescribed direction, and an inorganic film manufactured by means of a method for manufacturing the an inorganic film in which the particles or crystals are oriented in a prescribed direction.

Next, the second aspect of the present invention is described.

In the present invention, film-like material or bulk material is mounted on the surface of a target base sample, and a prescribed centrifugal force is imposed during heating, thereby manufacturing a composite adhesive material endowed with prescribed functionality and characteristics by tenaciously bonding the film-like material or the bulk material to the surface of the base sample to provide a composite adhesive material. In this case, the film-like material may, for example, be a hard film, electroconductive film, nonconductive film, piezoelectric film, or the like, but the film-like material is not limited to these. These materials are applied to the surface of the base material by coating, screen printing, sol-gel process, sputtering, or another method. The bulk material is exemplified by a ceramic with thermal resistance, a heat-resisting alloy, and the like, but the bulk material is not limited to these. These materials are applied to the surface of the base sample with a suitable means.

The target base sample of the present invention is exemplified by plastic, metal, single crystal, ceramic, glass, and the like; and the material to be bonded is exemplified by an organic substance, metal, ceramics, and the like, but the material to be bonded in not limited to these, and materials that have the same effect as these may be similarly used. In the present invention, the base sample can be endowed with desired functionality and characteristics by appropriately combining the base sample with the material to be bonded. In the present invention, specific advantageous examples of the base sample and the film-like or bulk material include a composite material composed of an inorganic film, fabricated with the sol-gel process, and bonded to a single crystal substrate; and a composite material composed of a ceramic-based hard film and bonded to a plastic base material. However, these are representative examples of the present invention, and the present invention is not limited to these.

The basic principle of the present invention is exemplified by mounting a base sample and the sample to be bonded in a prescribed position in a bonding device that includes a disc or a rotor that rotates at a high speed, and imposing a centrifugal force on these samples during heating, thereby tenaciously bonding the film-like material or the bulk material to the base sample.

In this case, the centrifugal force F that is imposed is described by the following equation.

$$F = mr\omega^2$$

In the equation, m is the mass of the material, r is the position of the sample from the center of the disc or rotor, and ω is the angular velocity of the disc or rotor. The centrifugal force that is imposed becomes greater with increased specific gravity of the material, increased position of the sample from the center of the disc or rotor, and increased angular speed of the disc or rotor. The angular velocity of the disc or rotor is proportional to the rotational speed of the disc or rotor, so the centrifugal force increases with the high-speed rotation of the disc or rotor. As a result, the distance of the sample from the center of the rotating disc or rotor is preferably long, and the rotational speed of the disc or rotor high, when an adhesive material with high bonding strength is desired. In the present invention, these rotational speeds are advantageously set to 500 to 100,000 rpm.

The bonding strength between materials increases as the centrifugal force that is imposed during heating becomes greater, but the imposed centrifugal force is determined by the mass of the material to be bonded, the distance of the sample from the center of the disc or rotor, and the rotational speed of the disc or rotor, as shown in equation above, and, as a result, the centrifugal force required for bonding can be generated by mounting the sample at a distance further from the center of the disc or rotor, and increasing the rotational speed of the disc or rotor when the mass of the material is small, for example.

In the present invention, the centrifugal force required for bonding is appropriately set to $10^{-10}$ to $10^8$ N. The minimum value of the centrifugal force here is preferably set to $10^{-10}$ N because a large centrifugal force is not required when powders are bonded, for example. The maximum value is preferably set to $10^8$ because a pressure load on a par with hot pressing is required for bonding some materials, for example.

FIG. 7 shows a schematic diagram of the method for bonding materials by imposing a centrifugal force. A centrifugal force generated from the radial direction of the disc by the high-speed rotation is imposed on the material (film-like material or bulk material) to be bonded. The film-like material or the bulk material is firmly pressed to the surface of the base sample (substrate) by the centrifugal force, and the bonding characteristics thereof are improved at the same time by the production of an interfacial reaction or the like between the material and the base sample.

The method of the present invention entails imposing a prescribed pressure on the material by way of a pressure means in a noncontact manner, so the generation of byproducts and soiling of the surface of the sample after baking are held in check, and a composite adhesive material in which a film-like material or a bulk material is tenaciously bonded to the surface of the base sample can be obtained in a clean environment.

The heating temperature for causing a film-like material or bulk material to tenaciously bond to the surface of the base sample is not particularly limited in the present invention. This is due to the fact that the diffusion rate of the substance and the interfacial reactivity of the materials differ greatly depending on the objective material types. A baking temperature of 400° C. is adopted when bonding $SiO_2$ film to a stainless steel substrate, for example, as shown in an example described below, but these are details that may be appropriately decided in accordance with the objective material type. In the present invention, a composite material with the desired functionality and characteristics may be synthesized by appropriately selecting the objective material type for these.

The bonding device that is used in the method of the present invention for bonding a base sample and a film-like or bulk material is one that includes as constituent elements thereof at least a drive means having a function for high speed rotation at a prescribed rotational speed, a disk or rotor mounted so that it can be rotated by the drive means, and a holding means that has a function for holding the base sample (substrate) and is formed on the peripheral portion on the disc or rotor. A specific structure of these is exemplified by a device comprising a work holder with a sample platform capable of high speed rotation, a heating unit for heating the work holder, a temperature control unit for controlling the heating temperature of the heating unit, a rotation unit for rotating the work holder, a rotation speed control unit for controlling the rotational speed of the rotation unit, a magnetic bearing unit with a vacuum seal, and a lid for hermetic sealing. However, the present invention is not limited to these, and these devices may be designed with any specification in accordance with the type, shape, objective, or other factors.

In the present invention, a film-like material or bulk material is formed or mounted on the surface of a base sample, and a centrifugal force is imposed during the heating step, whereby a composite adhesive material in which these materials are tenaciously bonded to the surface of the base material is manufactured; and the film-like material or the bulk material is tenaciously bonded to the surface of the base sample by imposing a prescribed centrifugal force on the base sample and the material in the steps in which these materials are heated and baked, thereby manufacturing a composite adhesive material endowed with prescribed functionality and characteristics. The film-like material or bulk material is firmly pressed to the surface of the base sample by the centrifugal force, an interfacial reaction or the like is produced at the same time, and the bonding characteristics are improved, making it possible to fabricate a composite adhesive material with desired bonding characteristics, functionality, and characteristics by appropriately adjusting the heating, baking conditions, imposed centrifugal force, and other factors in accordance with the type of base sample and film-like material or bulk material, the desired objective, or other factors. In the present invention, a prescribed pressure can be imposed on the material by way of a pressure means in a noncontact manner, making it possible to reduce the generation of byproducts and the soiling of the sample surface after heating and baking, which are inevitable drawbacks of conventional methods, and thereby to obtain a composite adhesive material in which a film-like material or a bulk material is tenaciously bonded to the surface of the base sample obtained in a clean environment.

Figure 1:
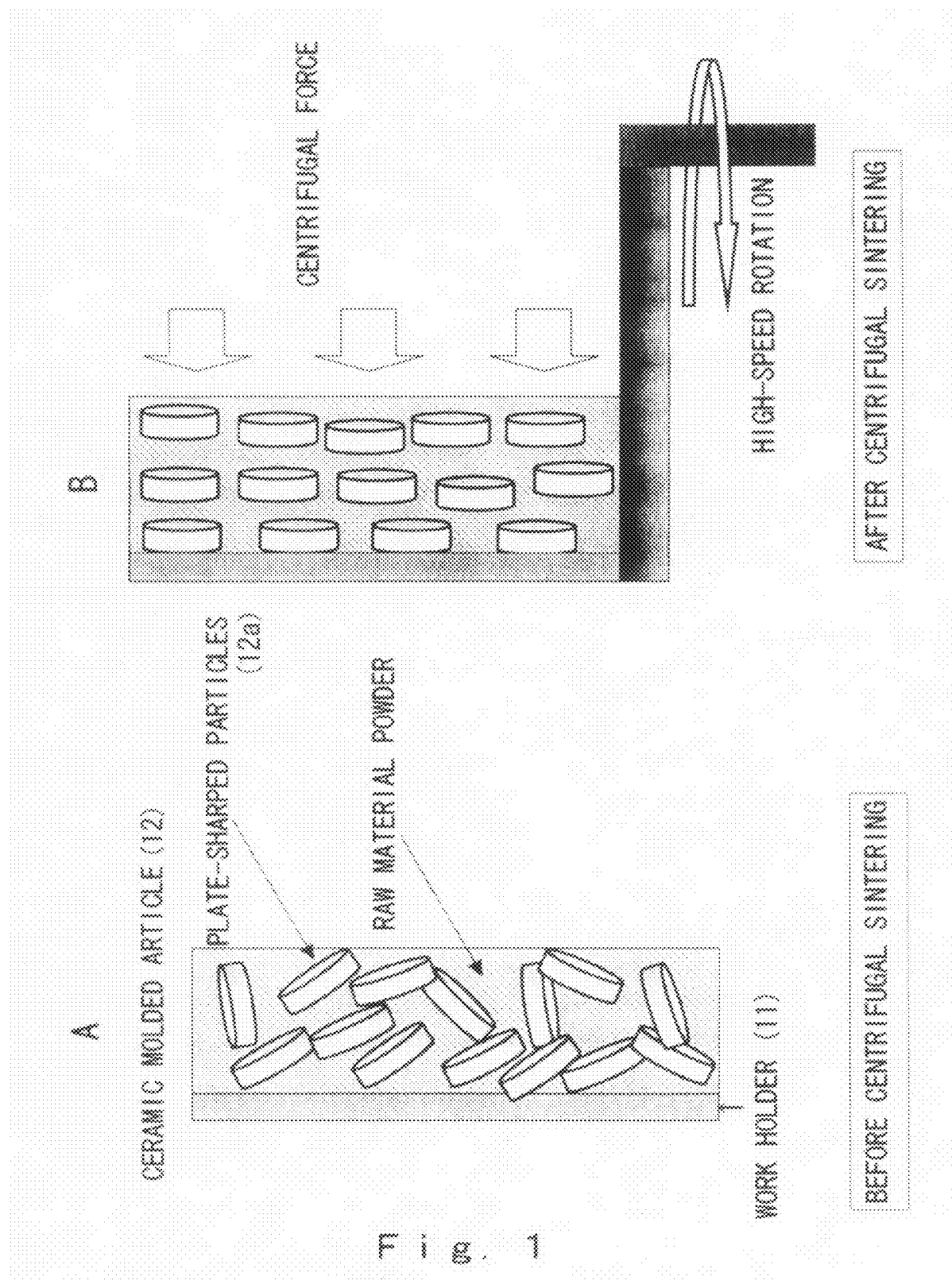
FIG. 1 is a schematic diagram showing the particle orientation prior to (A) and after (B) the application of a centrifugal force.

EXPLANATION OF THE REFERENCE NUMERALS 11 work holder
12 workpiece
12a plate-shaped particles

BEST MODE FOR CARRYING OUT THE INVENTION

Next, the present invention is described in detail based on examples, but the present invention is not limited in any way by the examples below.

EXAMPLE 1

It is possible to manufacture a highly oriented ceramic sinter with a centrifugal force because $Sr_3Ti_2O_7$ (Ruddlesden-Propper type structure) with a layered perovskite structure has strongly anisotropic crystals (lattice constant: a axis=0.390 nm, c axis=2.038 nm). In view of the above, an $Sr_3Ti_2O_7$ single crystal powder was fabricated with the molten salt method, this was added to the $Sr_3Ti_2O_7$ raw material powder and molded into the form of pellets, and a centrifugal force was imposed on the molded article to fabricate a ceramic sinter in which pronounced crystals are oriented.

First, the $Sr_3Ti_2O_7$ raw material powder that was used was one in which strontium carbonate ($SrCO_3$) and titanium oxide ($TiO_2$) were weighed to a molar ratio of 3:2, mixed with the aid of ethanol as a solvent, and heated at a temperature of 1,200° C.

Figure 2:
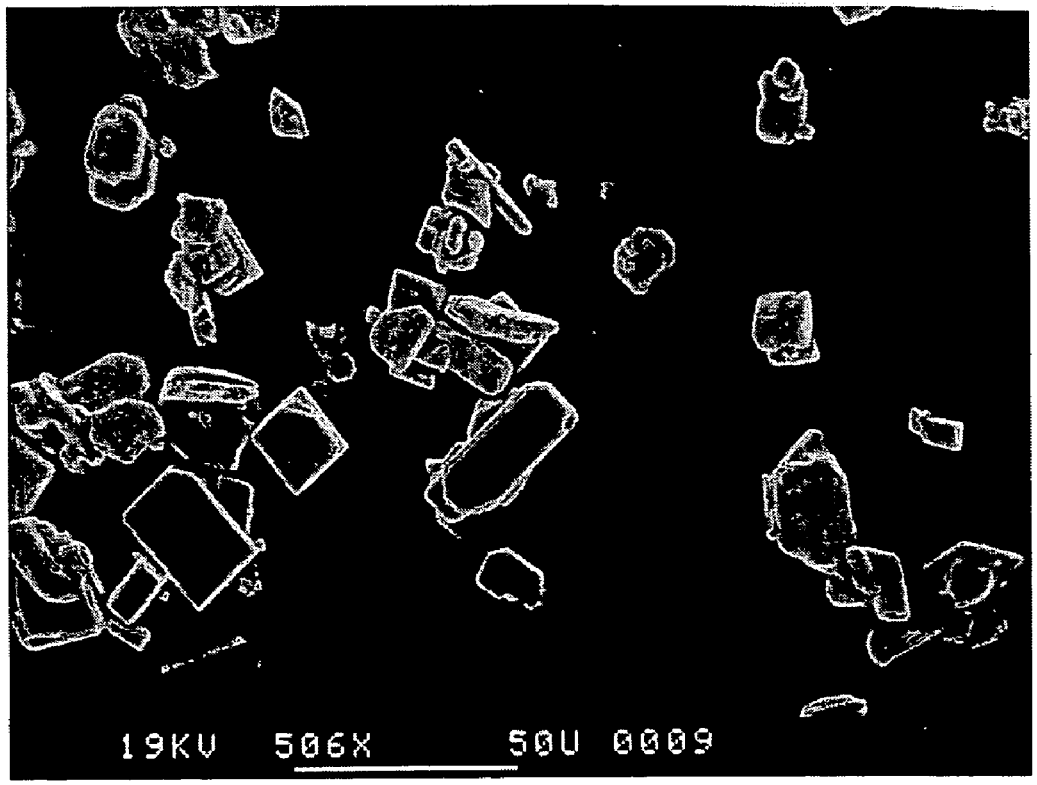
FIG. 2 is an electron photomicrograph of a single crystal powder composed of $Sr_3Ti_2O_7$ and used in the examples.

The $Sr_3Ti_2O_7$ single crystal powder was fabricated with the method described below. The raw materials $SrCO_3$ and $TiO_2$ were weighed to a molar ratio of 3.2:2, mixed, and dried. The resulting mixed powder ($SrTiO_3+TiO_2$) and potassium chloride (KCl) were mixed in a weight ratio of 1:1 and dried, the resulting powder was placed inside an alumina crucible, an aluminum plate was used as a lid, and the crucible was sealed with alumina cement and baked for four hours at 1,200° C. The baked powder was removed from the crucible and washed with warm water several tens of times, yielding plate-shaped $Sr_3Ti_2O_7$ single crystal particles such as those shown in FIG. 2.

Raw material powder and the plate-shaped $Sr_3Ti_2O_7$ single crystal particles obtained in this manner were weighted so as to establish a volume ratio of 5:95, and this was then mixed and dried. The resulting powder was molded into the form of pellets and set in the work holder of a centrifugal sintering furnace. The work holder was rotated at a rotational speed of 10,000 rpm, heated thereafter while the temperature was raised at a rate of 10° C./min to 1,200° C., held for 30 minutes, and furnace cooled. A molded article made in the same manner for comparative experimentation was placed in the centrifugal sintering furnace, and the work holder was heated according to the conditions described above without rotation.

Figure 3:
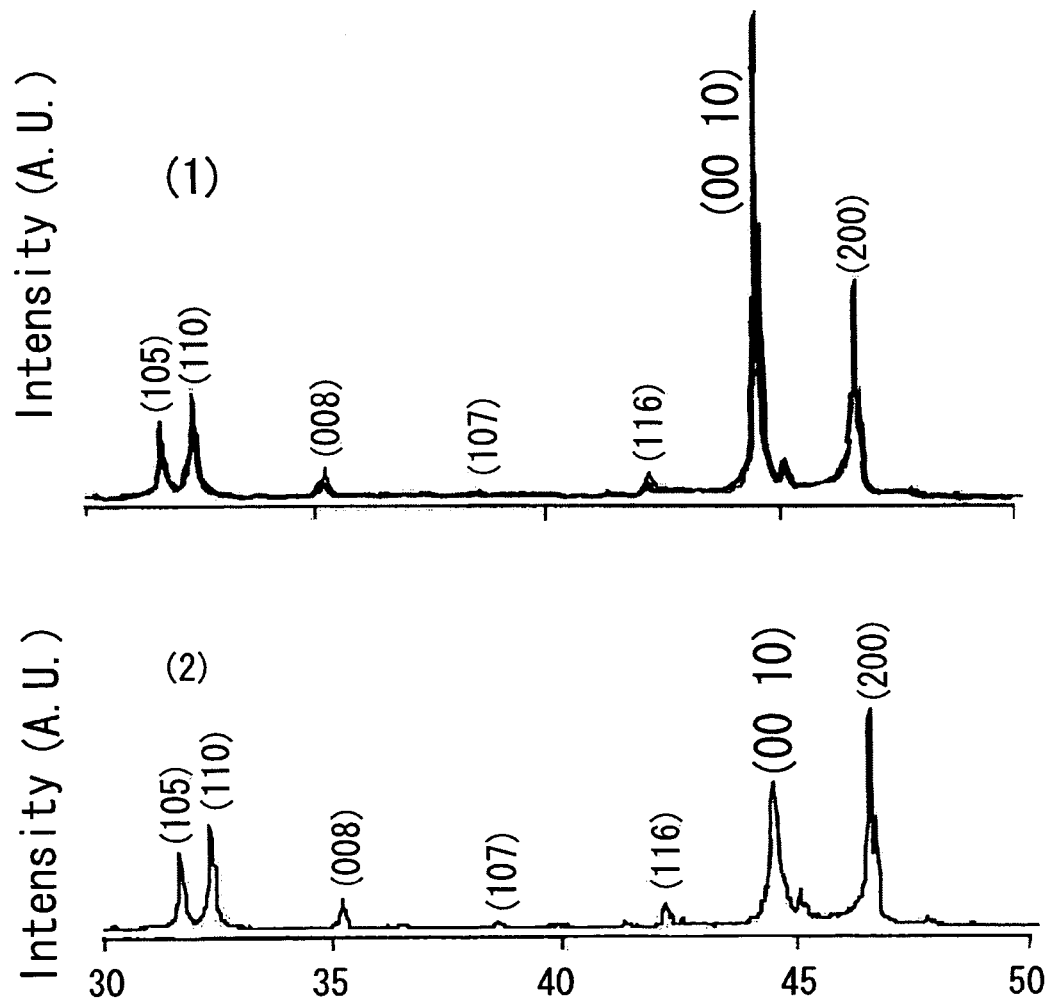
FIG. 3 is an X-ray diffraction pattern (A: with a centrifugal force; B: without a centrifugal force) of the $Sr_3Ti_2O_7$ sinter obtained in example 1.

Next, FIG. 3 shows the results of X-ray diffraction on the surface of the ceramic sinter comprising $Sr_3Ti_2O_7$ single crystal particles obtained with the above-described method.

Figure 4:
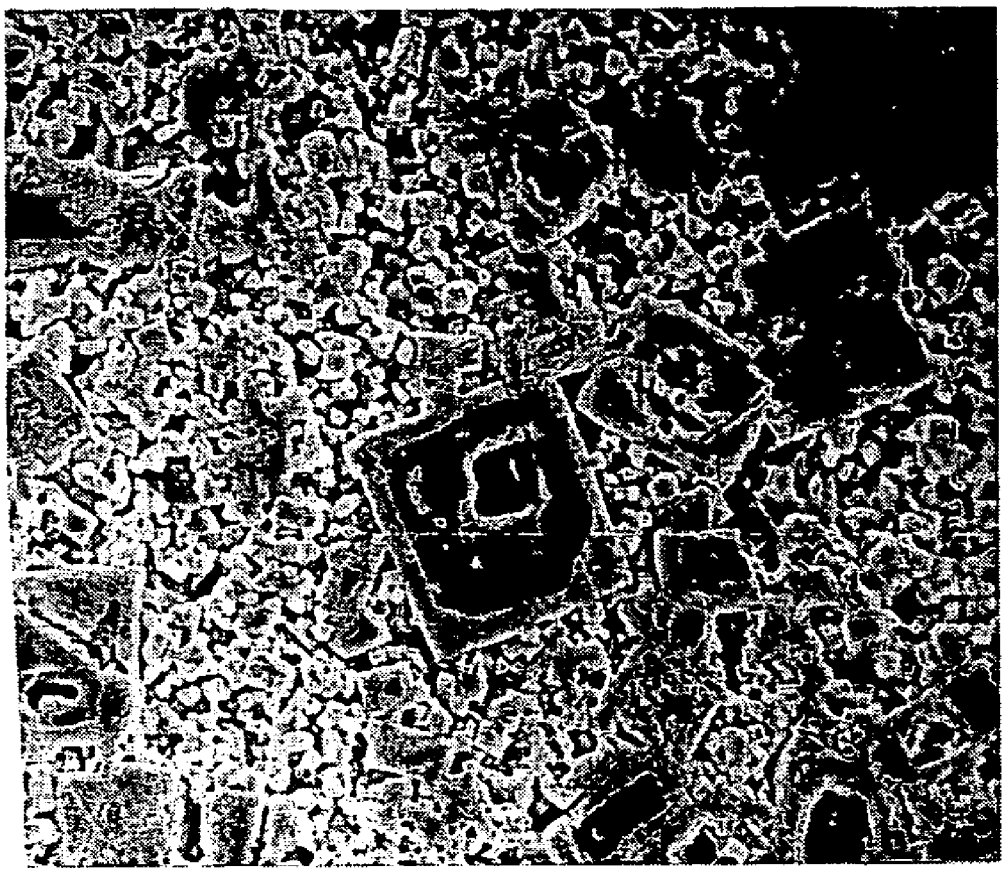
FIG. 4 is an electron photomicrograph of the $Sr_3Ti_2O_7$ sinter obtained in example 1.

The molded article (FIG. 3(A)) rotated at 10,000 rpm exhibited a strong peak in the (0010) plane, but a strong peak in the (0010) plane was not observed for the one that was not rotated (FIG. 3(B)). When the microstructure of the sinter on which a centrifugal force was imposed was observed, it was confirmed that the plate-shaped particles served as nuclei, and an $Sr_3Ti_2O_7$ phase was epitaxially grown thereon, as shown in FIG. 4. It is thought that the plate-shape particles were oriented perpendicular to the direction of the centrifugal force by the imposition of a centrifugal force during heating, and that an $Sr_3Ti_2O_7$ sinter in which pronounced crystals are oriented was obtained because the $Sr_3Ti_2O_7$ raw material epitaxially grew on the plate-shaped $Sr_3Ti_2O_7$ single crystal particles as the nuclei.

EXAMPLE 2

It is possible to manufacture a highly oriented material with a centrifugal force during baking because (Bi, Pb)-2223, which is a representative superconducting ceramic, has large anisotropic crystals.

Bismuth oxide ($Bi_2O_3$), lead oxide (PbO), strontium carbonate ($SrCO_3$), calcium carbonate ($CaCO_3$), and copper oxide (CuO) were used as the raw materials, and the powders were mixed and dried so as to achieve a composition of $Bi_{1.80}Pb_{0.34}Sr_{1.87}Ca_{2.02}Cu_{3.0}O_y$. The resulting powder was heated for 30 minutes in air at 700° C. The heated powder was formed into a fine powder by milling, placed in a solvent (main component: polyethylene glycol), and adjusted for viscosity to fabricate a paste.

The resulting paste was placed on a screen and applied by screen printing to an Ni substrate. The printing substrate was heated at 150° C. in a drying furnace and set in the work holder of a centrifugal sintering furnace. The work holder was rotated at a rotational speed of 10,000 rpm, heated thereafter while the temperature was raised at a rate of 10° C./min to 1,000° C., held for 30 minutes, and furnace cooled. A molded article for comparative experimentation was placed in the centrifugal sintering furnace, and the work holder was heated according to the conditions described above without rotation.

Figure 5:
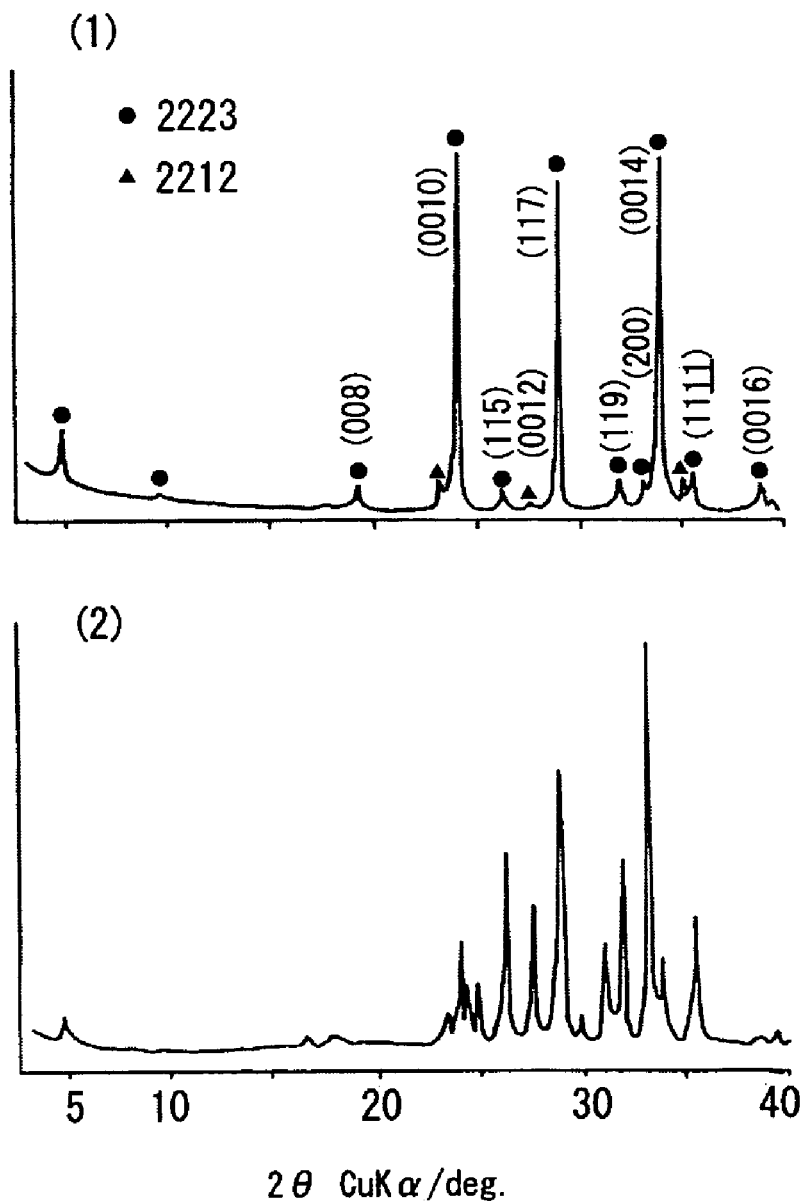
FIG. 5 is an X-ray diffraction pattern ((1): with a centrifugal force; (2): without a centrifugal force) of the (Bi, Pb)-2223 ceramic obtained in example 2.

FIG. 5 shows the results of X-ray diffraction on the surface of the ceramic on the substrate obtained in this manner. When rotated at a rotational speed of 10,000 rpm (FIG. 5(1)), a strong peak was exhibited for the (0010) plane, but a strong peak in the (0010) plane was not observed in the case that rotation was not performed (FIG. 5(2)). Based on the above, it is apparent that a centrifugal force is effective in orienting the particles and crystals of a superconducting ceramic.

EXAMPLE 3

A ceramic film in which pronounced crystals are oriented can be obtained by imposing a centrifugal force during heating on a precursor film obtained with the sol-gel process or another method. This is described below with $BaTiO_3$ film serving as an example.

In order to make a $BaTiO_3$ film, a coating solution was first prepared. Metal barium 0.03, titanium isopropoxide 0.03, acetyl acetone $7.0 \times 10^3$, water 0.09, acetic acid 1.21, and isopropyl alcohol 100 were blended together as starting materials. (All the numbers indicate the number of moles.)

The raw materials were mixed in a glove box under a flow of dry nitrogen after the pressure was reduced. The isopropyl alcohol and fragments of metal barium were placed in a flask, and an isopropyl alcohol solution of barium isopropoxide was prepared by heating the flask. A titanium isopropoxide solution was added to this solution, acetyl acetone was subsequently added, and the system was agitated for about three hours at a temperature of 80° C. in the glove box. An isopropyl alcohol solution of acetic acid and water was thereafter dropped to obtain a coating solution.

An $SrTiO_3$ substrate with a pronounced (100) plane was used in order to obtain a $BaTiO_3$ film in which crystals are oriented. The substrate was immersed in the coating solution, raised at a speed of 0.1 mm/s, and then dried at a temperature of 100° C. The coating and drying process was repeated five times, and the substrate was used as the sample for centrifugal sintering treatment. The substrate with the film formed thereon was mounted in the work holder of the centrifugal sintering device, and the work holder was heated to 600° C. at a temperature increase rate of 10° C./min and held for five minutes while rotated at a rotational speed of 10,000 rpm, yielding a $BaTiO_3$ film with a thickness of about 1 μm. A substrate with a film formed thereon was heated under the same conditions without rotation for comparison.

Figure 6:
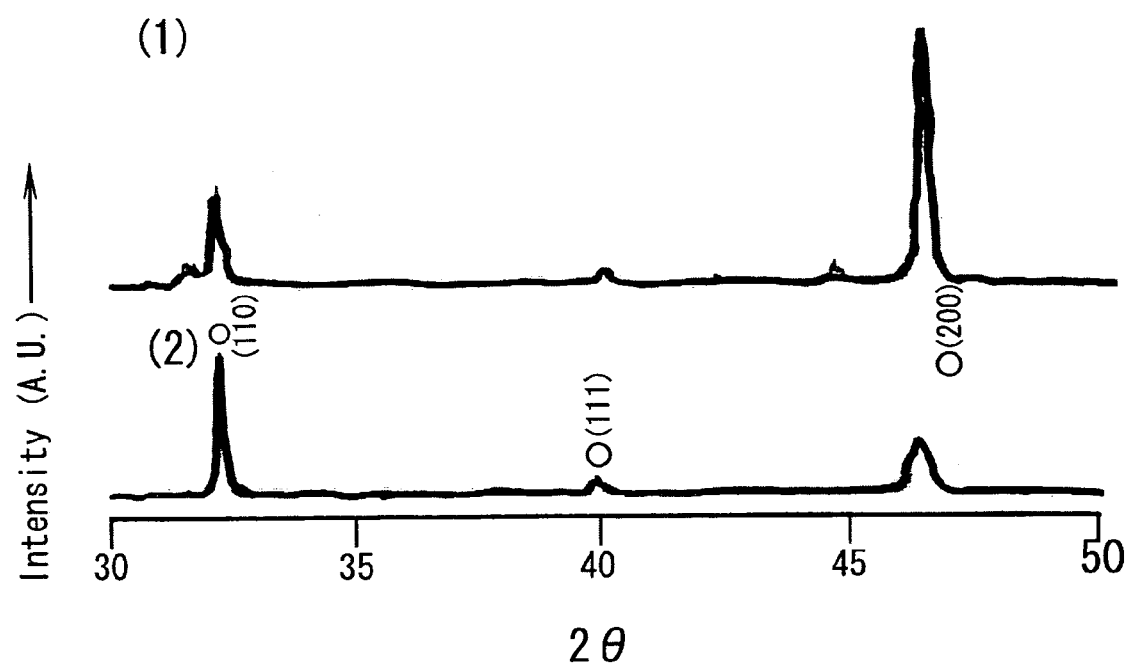
FIG. 6 is an X-ray diffraction pattern ((1): with a centrifugal force; (2): without a centrifugal force) of the $BaTiO_3$ inorganic film obtained in example 3.
Figure 7:
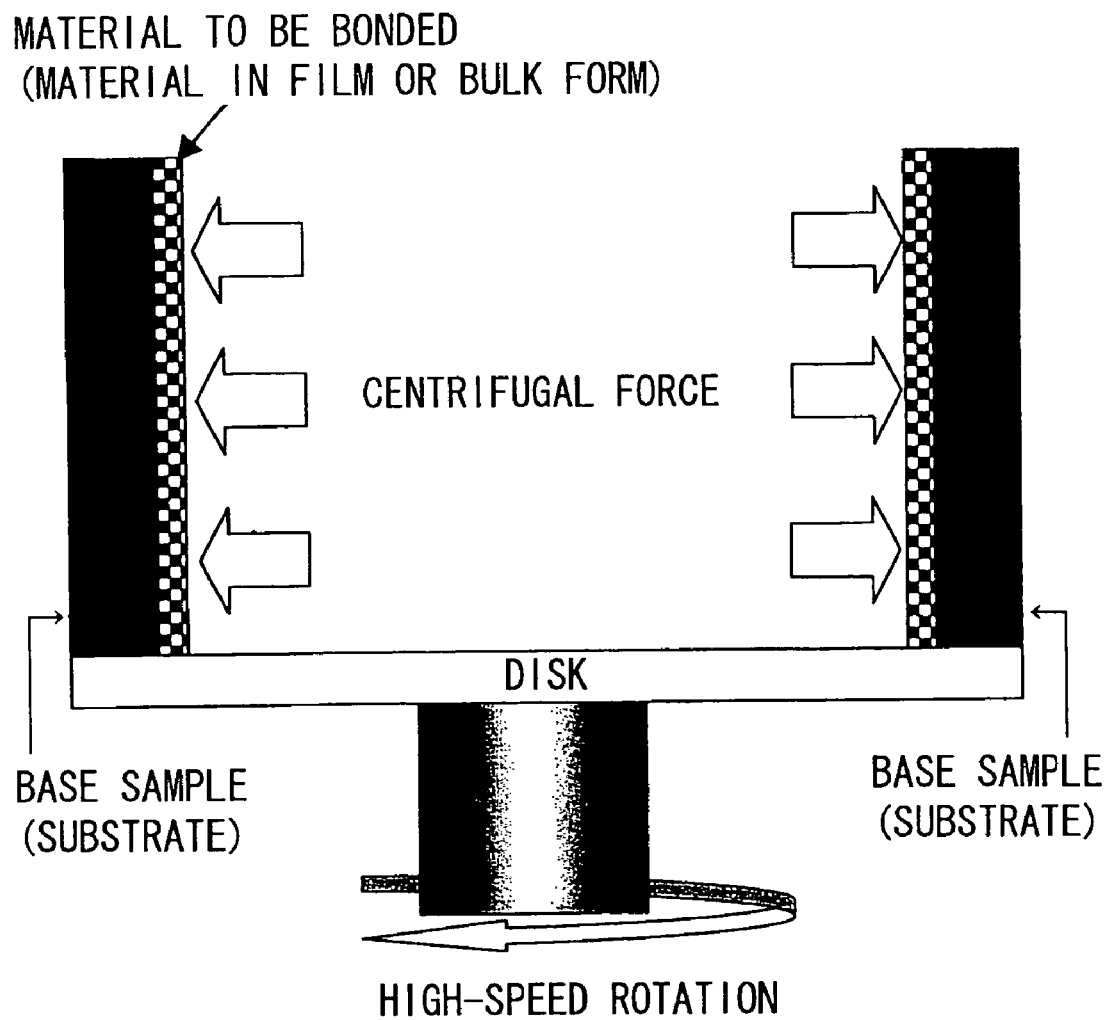
FIG. 7 shows a method for bonding a material (film-like material and bulk material) to a base sample by imposing a centrifugal force during heating.

FIG. 6 shows the results of an X-ray diffraction on the resulting substrate surface. When rotated at a rotational speed of 10,000 rpm (FIG. 6(1)), a strong peak was exhibited for the (200) plane, but a strong peak in the (200) plane was not observed in the case that rotation was not performed (FIG. 6(2)). Based on the above, it is apparent that imposing a centrifugal force on an inorganic film obtained from the sol-gel process during heating is effective in manufacturing a film in which the particles or crystals are oriented.

EXAMPLE 4

The present example describes the fabrication of a composite adhesive material in which an $SiO_2$ film is tenaciously bonded to a stainless steel substrate.

1. Fabrication of the Adhesive Material

First, n-$C_4H_9OH$ was added to $Si(OC_2H_5)_4$ (=TEOS) and mixed; $H_2O$ required for hydrolysis and $H_3PO_4$ as a catalyst were dissolved in $C_2H_5OH$ and added to the system. The mixed compound blended composition of the solution related to film formation had a molar ratio of TEOS:n-$C_4H_9OH$:$C_2H_5OH$:$H_2O$:$H_3PO_4$=1:7:7:7:0.05. This solution was applied to the surface of the stainless steel substrate with the dipping method, and this was taken as the test material (sample thickness: about 500 nm).

The heating (baking) of the material was conducted at the baking temperature, time, and centrifugal force shown in each of the processes below.

(1): Baking temperature: 400° C.; holding time: 1 minute (2): Baking temperature: 400° C.; holding time: 1 minute; centrifugal force: $1 \times 10^{-6}$N (with respect to the film on the substrate)

(3): The process in (1) and the process in (2).

2. Test Results

The bonding characteristics of the $SiO_2$ film on the stainless steel substrate were evaluated according to the following method. Uniaxial stress was applied to the stainless steel substrate with the attached $SiO_2$ film with the aid of a tensile tester, and the substrate was extended 1%. Next, a peeling test was performed with Cellotape (registered trademark), and the bonding characteristics were then quantitatively evaluated from the surface area of the $SiO_2$ film that remained on the stainless steel substrate. The sample surface after the peeling test was observed with a scanning electron microscope, and the area ratio of the SiO$_2$ film was calculated by processing the image.

Table 1 shows the remaining surface area percentages of the SiO$_2$ film on the surface of the stainless steel substrate that was heated (baked) with the processes and conditions described in (1) to (3) above. When the process was performed according to the conditions in (1), linear cracks were generated over the entire surface after a tensile test, and most of the SiO$_2$ film was peeled off when the sample was subjected to the peeling test; as a result, the remaining surface area percentage of the SiO$_2$ film was 12%. On the other hand, no cracks were generated after the tensile test for the samples that were subjected to a centrifugal force and baked, and the SiO$_2$ film was not diminished even after the peeling test. As a result, the remaining surface area percentages of the SiO$_2$ film on the surface of the substrate were 90% or more for the samples that were treated in accordance with (2) and (3). For the samples that were subjected to a centrifugal force and baked, it is thought that the samples expanded along with the expansion of the substrate because the material tenaciously adhered to the substrate.

TABLE 1

| HEAT TREATMENT CONDITIONS | REMAINING SURFACE AREA PERCENTAGE (%) OF SiO$_2$ FILM |
| --- | --- |
| (1) Baking temperature: 400° C.; holding time: 1 minute | 12 |
| (2) Baking temperature: 400° C.; holding time: 1 minute; centrifugal force: 1 × 10$^{-6}$ N | 98 |
| (3) (1) + (2). | 94 |

EXAMPLE 5

The present example is described with reference to the fabrication of a composite adhesive material in which a metal particulate film is formed on a substrate and heated under a centrifugal force.

1. Fabrication of the Adhesive Material

Commercial-grade particulate copper powder (average particle diameter: 3 microns) was placed in a solvent (main component: polyethylene glycol) to prepare a paste. The resulting paste was placed on a screen and printed on a silica glass substrate. After printing, the substrate was heated in the atmosphere at 110° C. The paste on the substrate was subjected to a centrifugal force of about 1×10$^{-4}$ N while being heated to 600° C. at a temperature increase rate of 10° C./min in a vacuum, and then held for five minutes at 600° C. and furnace cooled. As a comparison, a substrate with film formed thereon was heated under the same conditions without rotation.

2. Test Results

The adhesive strength of the copper film on the silica glass substrate was evaluated with a tensile test. The tensile test is a method in which a small, stiff needle is pressed against the copper film, the load is gradually increased, the needle is moved, and the load is measured when the copper film is peeled away. By applying a load to press the needle to the copper film on the substrate, the force required by the needle to break the film, that is to say, the force required to scratch the film and to peel it away from the substrate, was measured to determine the adhesive strength of the film to the substrate.

Figure 8:
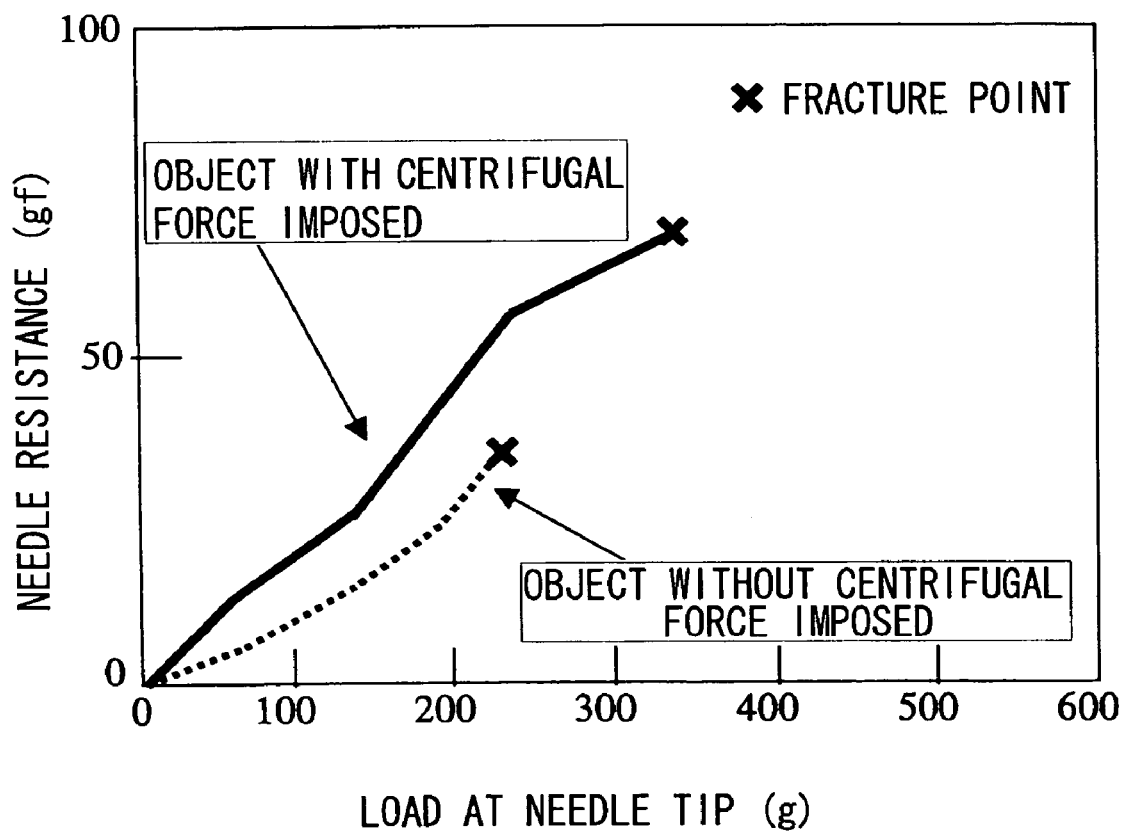
FIG. 8 shows the relationship between the load placed on the needle (needle tip load) and the resistance exerted on the needle.

FIG. 8 shows the relationship between the load placed on the needle (needle tip load) and the resistance exerted on the needle. When a load of 345 g was applied to the film that resulted from imposing a centrifugal force, only a portion of the film was completely removed from the substrate. On the other hand, when a load of 223 g was applied to the film resulting from no centrifugal force imposed thereon, the film was removed from the substrate. Here, the resistance exerted on the needle was 70 gf for the film that was treated with centrifugal force, and 38 gf for the film that was only heated and not treated with centrifugal force. From these results it is apparent that the film resulting from imposing a centrifugal force during heating tenaciously bonds to the substrate, and has strong adhesive strength.

EXAMPLE 6

The present example is described with reference to the fabrication of a composite adhesive material in which aluminum metal is bonded to an aluminum nitride base material.

1. Fabrication of the Adhesive Material

An aluminum nitride sinter was fabricated with the method described below. First, 5 mass % of yttria was added to commercial-grade aluminum nitride powder, and the components were mixed using methanol as a solvent in a ball mill. After the powder was dried, it was heated under a nitrogen atmosphere for three hours at 1,800° C. to fabricate a ceramic sinter. The resulting sinter was thereafter worked into the form of a plate having the dimensions 10 mm×10 mm×3 mm (thickness), and this plate was used as the base sample.

The metallic aluminum was obtained by working commercial-grade 99.999% pure aluminum into the form of a plate having the dimensions 10 mm×10 mm×3 mm (thickness), and this plate was used as the sample for bonding. The aluminum nitride and metallic aluminum were fixed with an organic adhesive and baked under a centrifugal force.

The baking of the material was conducted at the baking temperature, time, and centrifugal force shown in each of the processes below.

(1): Baking temperature: 500° C.; holding time: 1 minute (2): Baking temperature: 500° C.; holding time: 1 minute; centrifugal force: 1×10$^{-6}$N 2. Test Results The adhesive aluminum nitride/metallic aluminum article was evaluated with a tensile test. A test piece was cut from the adhesive article on both sides of the boundary of the adhesive article, a metal tensile test piece jig was attached to both ends of the test piece with an instant adhesive, and the tensile test was carried out at room temperature with a tester. The sample on which a centrifugal force was not imposed broke immediately at a tensile strength of 2.3 MPa. On the other hand, the sample on which a centrifugal force of 1×10$^{-6}$ N was imposed had a tensile strength of 80 MPa, and it was apparent that the sample on which a centrifugal force was imposed and baked exhibited a tenacious bond.

INDUSTRIAL APPLICABILITY

As described above, the present invention relates to a method for manufacturing a ceramic sinter or inorganic film in which pronounced anisotropic particles or anisotropic crystals are oriented by imposing a centrifugal force on the workpiece during the baking step, and has beneficial effects such as those enumerated below. The present invention is technologically very valuable in that it provides a method for manufacturing a ceramic sinter and an inorganic film in which the drawbacks of conventional methods are solved, and also provides the ceramic sinter and inorganic film thus manufactured.

(1) Sheet lamination such as the doctor blade process is unnecessary in order to produce a thick molded article for orientation, the manufacturing process has simple steps, the required manufacturing time is short, and skilled personnel is not required.

(2) The orientation proceeds uniformly from the surface to the interior of the oriented article, and there are substantially no differences in the orientation of the particles. The sinter is resistant to shape irregularities, and the particles and crystals can be uniformly oriented.

(3) A rotating device is required to impose a centrifugal force, but there is no need for a special device such as a magnetic field generator when magnetic anisotropy is used, maintenance is simple, and common production facilities can be used.

(4) The surface of the workpiece does not become soiled, and byproducts are not generated such as in hot press sintering. This approach is therefore advantageous in that working after grinding is not required, costs are low, and a thin oriented film with a thickness of several tens of micrometers to several millimeters can be manufactured.

The present invention also relates to a method for manufacturing an adhesive material and an adhesive material, and the following effects can be obtained.

(5) In the method for bonding a film-like material or bulk material to the surface of a base sample, a composite adhesive material in which the film-like material or bulk material is tenaciously bonded to the surface of the base sample can be manufactured by imposing a prescribed centrifugal force when the material is heated.

(6) An adhesive material can be manufactured by a method in which a prescribed pressure is imposed on the material by way of a pressure means in a noncontact manner.

(7) As a result, the generation of byproducts and the soiling of the sample surface after baking are held in check, and a composite adhesive material in which a film-like material or a bulk material is tenaciously bonded to the surface of the base sample can be obtained in a clean environment.

(8) An adhesive material endowed with prescribed functionality and characteristics can be manufactured.

The invention claimed is:

1. A method for manufacturing a ceramic sinter in which ceramic particles are oriented, comprising sintering a ceramic molded article containing ceramic particles with anisotropic shapes, imposing a centrifugal force during the sintering step on the ceramic particles with anisotropic shapes, in the latter stages of sintering by holding the particles on a base substrate formed on the peripheral portion of a disc or rotor to manufacture a ceramic sinter in which the particles are oriented.

2. A method for manufacturing an inorganic film with oriented particles, comprising forming a precursor film on a single crystal substrate or on a substrate on which a metal or ceramic has been vapor-deposited, heating the film, and imposing a centrifugal force during the heating step on anisotropic particles which are present in the precursor film by holding the film on the substrate formed on the peripheral portion of a disc or rotor to manufacture an inorganic film with oriented particles.

3. The method according to claims 1 or 2, wherein the centrifugal force is 10 to 700,000 G.

4. The method according to claims 1 or 2, wherein the sintering or heating step is carried out at a temperature of 100 to 1,900° C.

5. A method for manufacturing a ceramic sinter or inorganic film in which particles are oriented, said method comprising:
   imposing a centrifugal force on a material in which anisotropic particles are present, by holding the material on a base substrate formed on the peripheral portion of a disc or rotor during a sintering step in manufacturing the ceramic sinter or during a heating step in manufacturing the inorganic film.

* * * * *